UNITED STATES PATENT OFFICE.

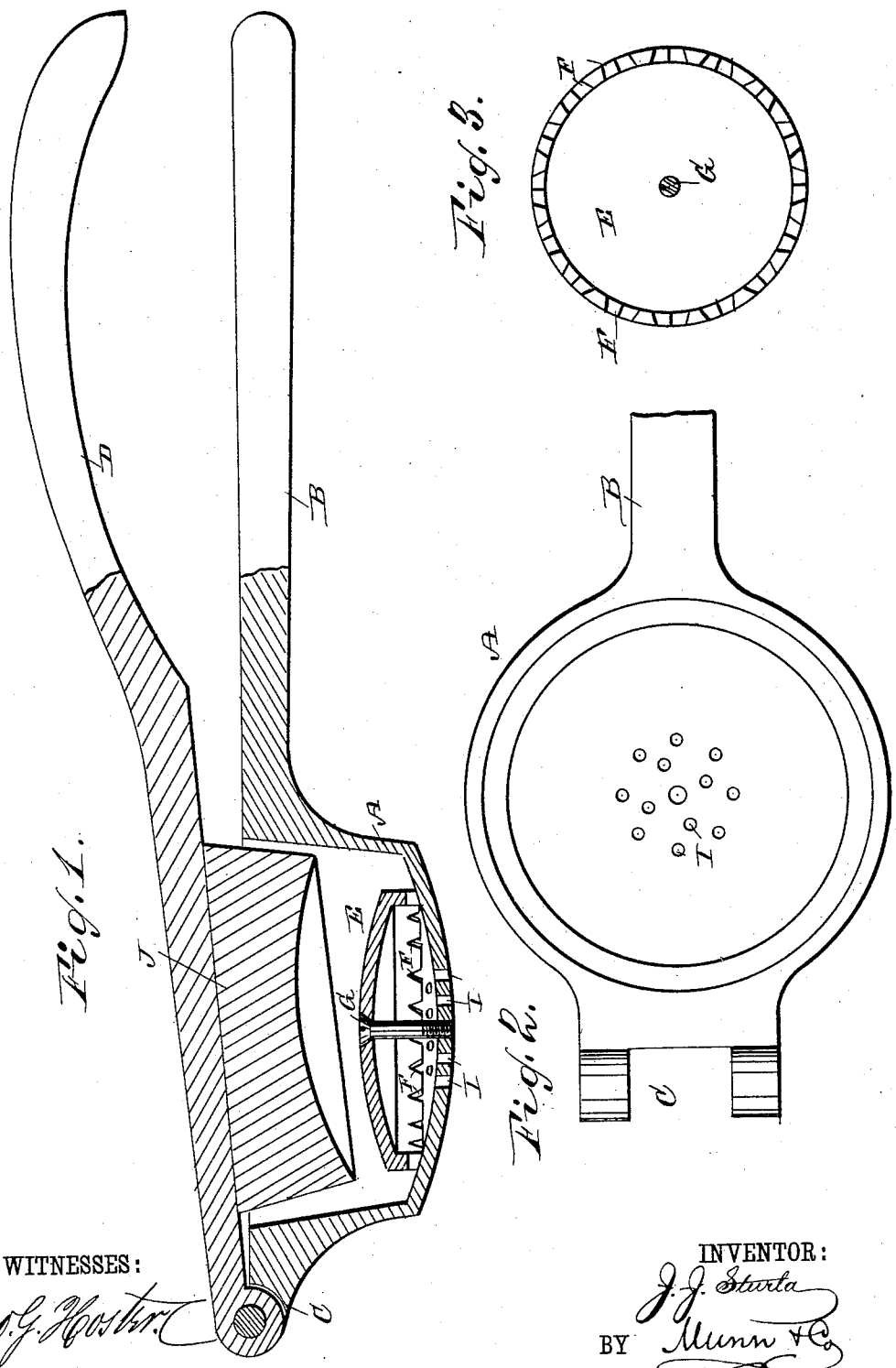

JACOB J. STURLA, OF MEMPHIS, TENNESSEE.

LEMON-SQUEEZER.

SPECIFICATION forming part of Letters Patent No. 336,672, dated February 23, 1886.

Application filed July 7, 1885. Serial No. 170,900. (No model.)

*To all whom it may concern:*

Be it known that I, JACOB J. STURLA, of Memphis, in the county of Shelby and State of Tennessee, have invented a new and Improved Lemon Squeezer, of which the following is a full, clear, and exact description.

The object of my invention is to provide a new and improved lemon-squeezer which is so constructed that the juice cannot flow out too rapidly at the bottom or squirt out at the top.

The invention consists in the combination, with a cup having a perforated bottom, of a lever pivoted on the same and having a block fitting in the cup, and of an inverted-cup-shaped plate having notches in the rim, and which plate is held on the bottom of the cup by a screw.

Reference is to be had to the accompanying drawings, forming part of this specification, in which similar letters of reference indicate corresponding parts in all the figures.

Figure 1 is a longitudinal sectional elevation of my improved lemon-squeezer. Fig. 2 is a plan view of the cup. Fig. 3 is a plan view of the under side of the removable bottom of the cup.

The cup A is provided with a handle, B, and two jaws, C, opposite the same, and between the said jaws a lever, D, is pivoted, and on the under side of the same a block, J, is secured, which fits in the cup and has a concave under side. The cup A has a series of apertures, I, in its bottom, and on the said apertured bottom an inverted cup shaped bottom plate, E—in the downwardly-projecting rim of which notches F are formed—is held by a screw, G, passed through the plate E and screwed into an aperture in the middle of the bottom of the cup. The lemon is placed on the plate E, and the lever D is pressed toward the handle B, and the lemon is pressed between the block J and the plate E. The cup A is so deep that the juice cannot squirt out of the top, and the cup-shaped plate E prevents the juice from flowing out through the bottom apertures too rapidly.

Having thus described my invention, what I claim as new, and desire to secure by Letters Patent, is—

1. A lemon-squeezer consisting of the cup A, having apertures in its bottom, the inverted-cup-shaped plate over said apertures and notched on the lower edge of its rim, and the pivoted lever having a presser block or projection, substantially as set forth.

2. The combination, with the cup A, having the handle B and apertures I, of the lever D, pivoted on the cup, the block J, secured on the lever and having its bottom concaved, and of the inverted-cup-shaped plate E, having notches in its edge and held to the bottom of the cup by a screw, substantially as herein shown and described.

JACOB J. STURLA.

Witnesses:
 H. C. THOMPSON,
 GEORGE SCHMAZREED, Jr.